(12) United States Patent
Tanaka et al.

(10) Patent No.: US 6,414,918 B1
(45) Date of Patent: Jul. 2, 2002

(54) DISC REPRODUCING APPARATUS AND DISC REPRODUCING METHOD

(75) Inventors: Hiroaki Tanaka, Hadano; Takuji Yoshida, Yokohama, both of (JP)

(73) Assignee: Kabushiki Kaisha Toshiba, Kawasaki (JP)

(*) Notice: Subject to any disclaimer, the term of this patent is extended or adjusted under 35 U.S.C. 154(b) by 0 days.

(21) Appl. No.: 09/293,883

(22) Filed: Apr. 19, 1999

(30) Foreign Application Priority Data

Apr. 20, 1998 (JP) .......................................... 10-109138

(51) Int. Cl.$^7$ ................................................ G11B 7/00
(52) U.S. Cl. ............................... 369/47.24; 369/47.26; 369/47.3; 369/124.13
(58) Field of Search ............................. 369/47.28, 47.29, 369/47.3, 47.26, 47.23, 47.24, 47.25, 47.27, 59.19, 124.13, 124.05, 53.2, 53.3, 47.4, 47.43; 360/51; 329/316

(56) References Cited

U.S. PATENT DOCUMENTS

| | | | | |
|---|---|---|---|---|
| 4,688,205 A | * | 8/1987 | Abiko | 369/59.19 |
| 4,870,684 A | * | 9/1989 | Arai et al. | 329/316 |
| 4,918,677 A | * | 4/1990 | Ashinuma et al. | 369/59.16 |
| 5,045,956 A | * | 9/1991 | Ejima | 360/51 |
| 5,528,574 A | * | 6/1996 | Takeuchi et al. | 369/47.4 |
| 5,598,396 A | * | 1/1997 | Horibe et al. | 369/47.3 |
| 5,636,196 A | * | 6/1997 | Kumagai | 369/47.4 |
| 5,729,515 A | * | 3/1998 | Inagawa et al. | 369/47.3 |
| 5,802,027 A | * | 9/1998 | Senshu | 369/47.35 |
| 5,982,724 A | * | 11/1999 | Hayashi et al. | 369/47.3 |
| 6,081,492 A | * | 6/2000 | Asai et al. | 369/59.14 |
| 6,163,516 A | * | 12/2000 | Ma | 369/53.2 |

* cited by examiner

*Primary Examiner*—Thang V. Tran
(74) *Attorney, Agent, or Firm*—Oblon, Spivak, McClelland, Maier & Neustadt, P.C.

(57) ABSTRACT

A disc reproducing apparatus is disclosed, that comprises an optical pickup for reading a signal from a disc, a level slice PLL circuit for reproducing data from the signal read by the optical pickup, a signal processing unit for reproducing data with the clock signal reproduced by the level slice PLL circuit, and a range changing circuit for changing a linear velocity range (namely, a capture range) of the level slice PLL circuit in a time period at least after an occurrence of a reproduction command until data is reproduced from the disc at a target linear velocity corresponding to the reproduction command. Thus, even in a transient state such as an accelerating/decelerating state of a CD-ROM or the like, data can be properly reproduced from the disc.

14 Claims, 6 Drawing Sheets

| TARGET LINER VELOCITY RANGE \ CURRENT LINER VELOCITY RANGE | (0) | (1) | (2) | (3) | (4) | (5) |
|---|---|---|---|---|---|---|
| (1) | 0.4 / 0.7 |  | 1.2 / 2.2 | 0.8 / 1.7 | 0.7 / 1.3 | 0.4 / 0.7 |
| (2) | 0.4 / 0.7 | 0.6 / 1.0 |  | 0.8 / 1.7 | 0.7 / 1.3 | 0.4 / 0.7 |
| (3) | 0.4 / 0.7 | 0.6 / 1.0 | 1.2 / 2.2 |  | 0.7 / 1.3 | 0.4 / 0.7 |
| (4) | 0.4 / 0.7 | 0.6 / 1.0 | 1.2 / 2.2 | 2.5 / 4.6 |  | 0.4 / 0.7 |
| (5) | 0.4 / 0.7 | 0.6 / 1.0 | 1.2 / 2.2 | 2.5 / 4.6 | 3.0 / 5.0 |  |

UPPER ROW: SMALL INERTIA MOMENT (8-cm DISC)   UNIT:SECOND
LOWER ROW: LARGE INERTIA MOMENT (12-cm DISC)

DISC REPRODUCING APPARATUS AND DISC REPRODUCING METHOD

BACKGROUND OF THE INVENTION

1. Field of the Invention

The present invention relates to a disc reproducing apparatus and a disc reproducing method for reading information recorded on an optical disc such as a CD, a CD-ROM, or a DVD-ROM.

2. Description of the Related Art

Generally, in a disc reproducing apparatus that reproduces a signal from an optical disc such as a CD, a CD-ROM, or a DVD-ROM in a constant linear velocity recording method, when the frequency of an input signal is in a capture range of a PLL (Phase-Locked Loop) circuit, an output signal of an optical pickup can be demodulated at a proper timing.

However, in such a disc reproducing apparatus, when a signal is reproduced at the maximum reproducing speed, it takes a time period after the stop state of the optical disc until the disc is rotated at the maximum reproducing speed by a disc motor. Thus, while the disc motor is accelerating the rotating speed of the optical disc, the frequency of a signal that is read from the optical disc by the optical pickup to the PLL circuit varies time by time.

However, the capture range of the PLL circuit is optimized for an input signal at the maximum reproducing speed. Thus, the disc reproducing apparatus cannot properly read data until the rotating speed of the optical disc becomes fast and the frequency of an input signal of the PLL circuit is in the capture range.

SUMMARY OF THE INVENTION

This invention is disclosed in Japanese Patent Application No. 10-109138 filed on Apr. 20, 1998, and the entire disclosure thereof is incorporated herein by reference.

An object of the present invention is to provide a disc reproducing apparatus and a disc reproducing method that can correctly read information from an optical disc even in a transient state such as an accelerating/decelerating state of the optical disc.

A first aspect of the present invention is a disc reproducing apparatus, comprising an optical pickup for reading a signal from a disc, a clock signal reproducing circuit for reproducing a clock signal so as to reproduce data from the signal read by the optical pickup, a signal processing circuit for reproducing data with the clock signal reproduced by the clock signal reproducing circuit, and a range shifting means for shifting a capture range of the clock signal reproducing circuit.

According to the present invention, the capture range of the clock signal reproducing circuit can be shifted in a time period at least after an occurrence of a reproduction command until data is reproduced from the disc at a target linear speed corresponding to the reproduction command.

Thus, according to the present invention, in the state that the rotating speed of the disc varies time by time, the frequency of an input signal can be placed in the capture range that can be shifted by the clock signal reproducing circuit. Consequently, even in a transient state such as an accelerating/decelerating state of the disc, data can be properly reproduced from the disc.

A second aspect of the present invention is a disc reproducing apparatus, comprising an optical pickup for reading a signal from a disc, two clock signal reproducing circuits for reproducing clock signals so as to reproduce data from the signal read by the optical pickup, the two clock signal reproducing circuits having different capture ranges, two signal processing circuits for reproducing data with the clock signals reproduced from the two clock signal reproducing circuits, the two signal processing circuits being disposed corresponding to the two clock signal reproducing circuits, a selecting means for selecting reproduction data that has been correctly reproduced by one of the two signal processing circuits, and a range shifting means for shifting the capture range of the clock signal reproducing circuit corresponding to a first signal processing circuit of the two signal processing circuits when the selecting means selects reproduction data reproduced from a predetermined one as a second signal processing circuit of the two signal processing circuits.

In other words, according to the present invention, while the first signal processing circuit with a high (low) capture range is correctly reproducing data, the capture range of the second signal processing circuit (with a low (high) capture range) is changed to a capture range that is higher (lower) than the capture range of the first signal processing circuit. Thus, data can be properly reproduced from the disc corresponding to the chronological variation of the linear velocity of the disc. Consequently, even in a transient state such as an accelerating/decelerating state of the disc, reproduction data can be successively output.

A third aspect of the present invention is a disc reproducing apparatus, comprising an optical pickup for reading a signal from a disc, a plurality of clock signal reproducing circuits for reproducing clock signals so as to reproduce data from the signal read from the disc by the optical pickup, the plurality of clock signal reproducing circuits having different capture ranges, a plurality of signal processing circuits for reproducing data with the clock signals reproduced from the plurality of clock signal reproducing circuits, the plurality of signal processing circuits being disposed corresponding to the plurality of clock signal reproducing circuits, and a selecting means for selecting reproduction data that has been correctly reproduced by one of the plurality of signal processing circuits.

In other words, according to the present invention, since correct reproduction data is selected from outputs of a plurality of clock signal reproducing circuits with different capture ranges, data can be properly reproduced from the disc corresponding to the chronological variation of the linear velocity of the disc. Consequently, even in a transient state such as an accelerating/decelerating state of the disc, reproduction data can be successively output.

These and other objects, features and advantages of the present invention will become more apparent in light of the following detailed description of a best mode embodiment thereof, as illustrated in the accompanying drawings.

DESCRIPTION OF PREFERRED EMBODIMENTS

Next, with reference to the accompanying drawings, embodiments of the present invention will be described.

[First Embodiment]

Figure 1:
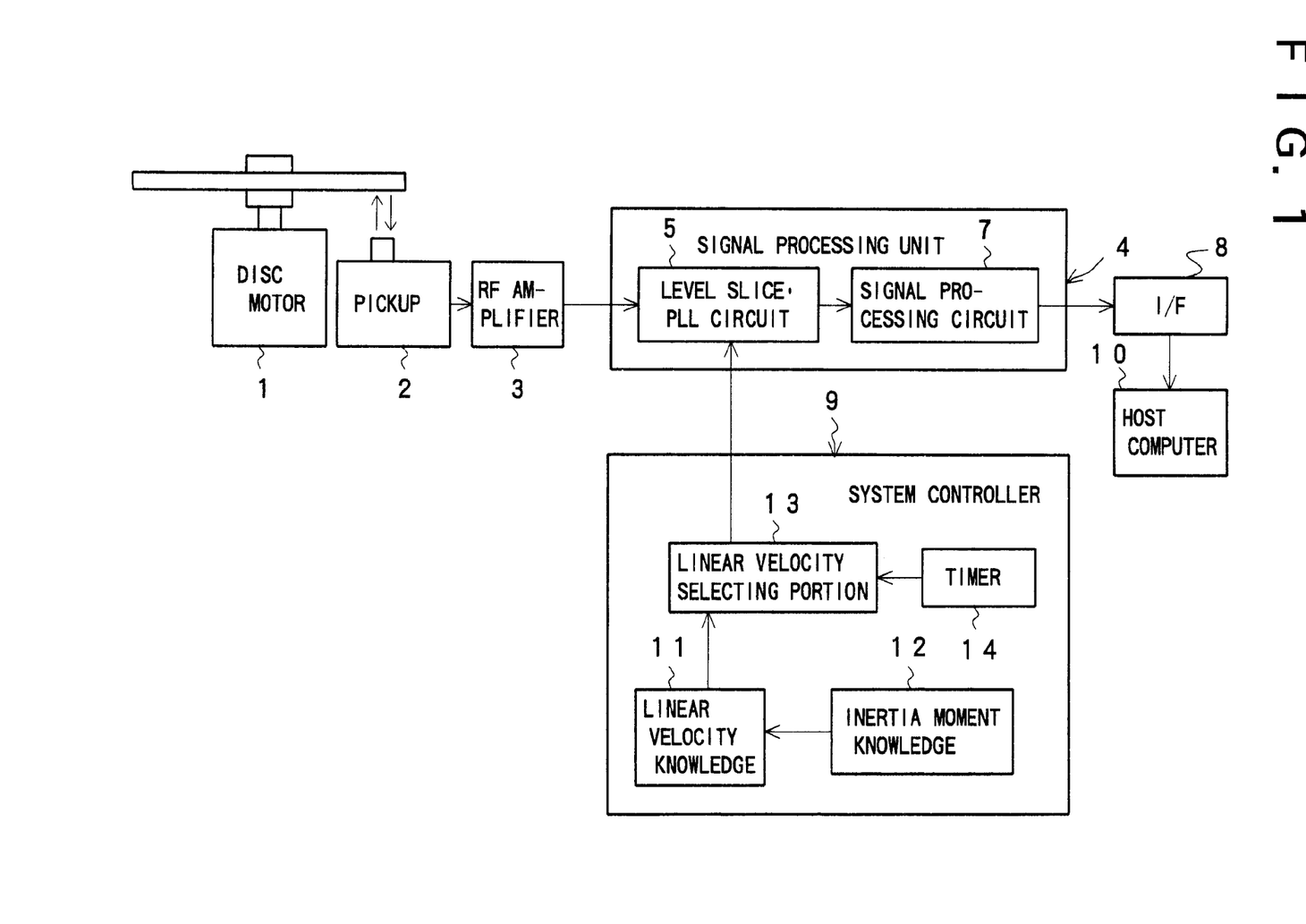
FIG. 1 is a block diagram showing the structure of a disc reproducing apparatus according to a first embodiment of the present invention.

FIG. 1 is a block diagram showing the structure of a disc reproducing apparatus according to a first embodiment of the present invention.

As shown in FIG. 1, a signal that is read by an optical pickup 2 from a disc driven by a disc motor 1 is supplied to an RF amplifier 3. The RF amplifier 3 extracts a focus error signal and a tracking error signal from an output signal of the optical pickup 2 and supplies the extracted signals to a focus/tracking controlling circuit. In addition, the RF amplifier 3 supplies an amplified RF signal to a level slice PLL circuit 5 of a signal processing unit 4. The signal processing unit 4 is composed of the level slice PLL circuit 5 and a signal processing circuit 7. The level slice PLL circuit digitizes the amplified RF signal and outputs an EFM (Eight to Fourteen Modulation) signal. In addition, the level slice PLL circuit 5 generates a PLL clock signal that synchronized with the EFM signal so as to read the EFM signal.

The EFM signal and the PLL clock signal are supplied to the signal processing circuit 7. The signal processing circuit 7 detects a synchronous signal of a CD or the like with the PLL clock signal, separates desired data corresponding to the synchronous signal, and performs the EFM demodulating process for the separated data. Thereafter, the signal processing circuit 7 supplies the demodulated data to an I/F (interface) 8. The I/F 8 exchanges various operation commands and data with a host computer and performs a communication controlling operation. The operation commands are exchanged between a system controller 9 and the host computer 10 through the I/F 8.

Figure 2:
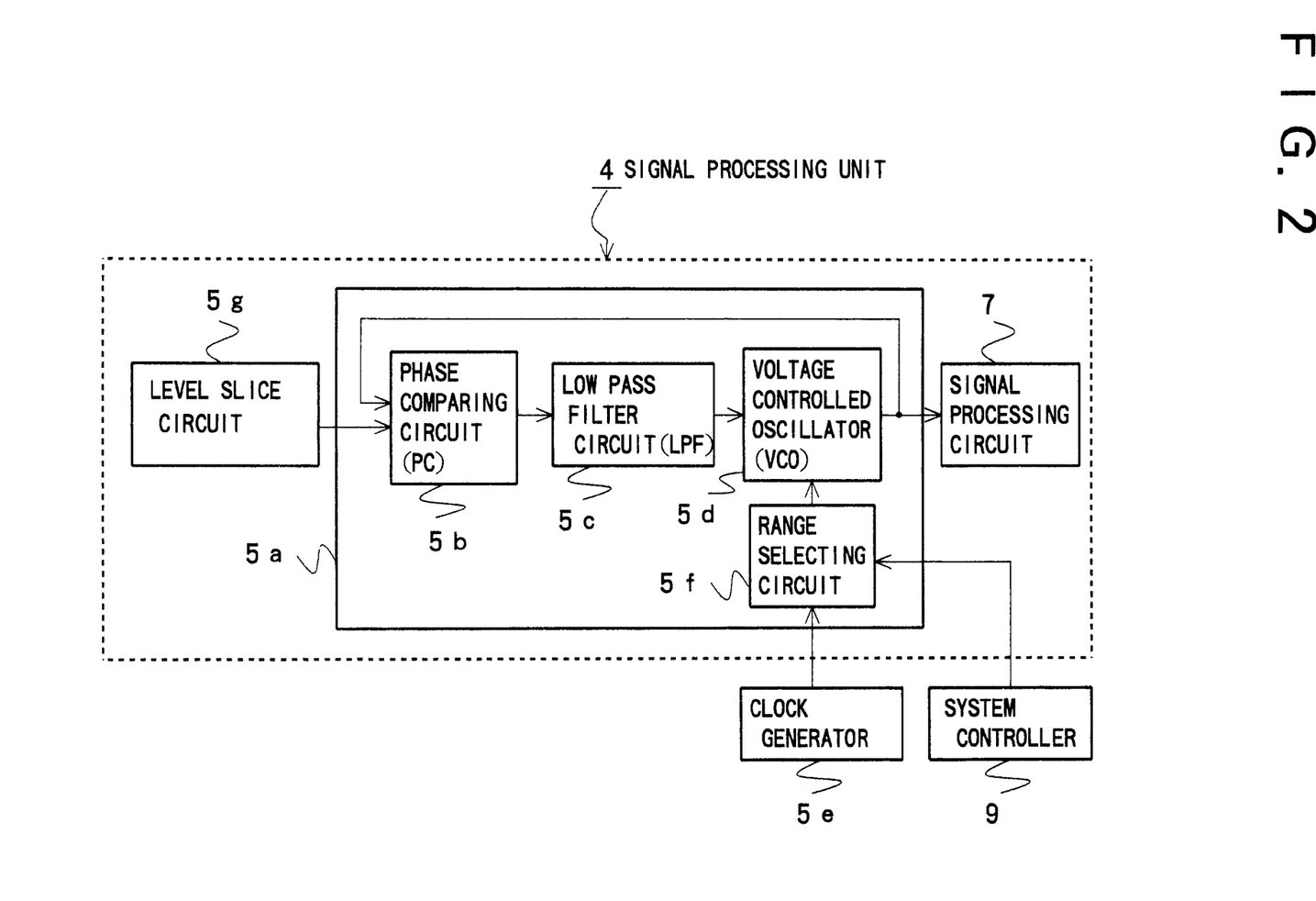
FIG. 2 is a block diagram showing the structure of a PLL circuit of the disc reproducing apparatus shown in FIG. 1.

Next, a PLL circuit 5a that composes a part of the level slice PLL circuit 5 will be described. FIG. 2 is a block diagram showing the structure of the PLL circuit 5a. The PLL circuit 5a comprises a phase comparing circuit (PC) 5b, a low pass filter (LPF) 5c, a voltage controlled oscillator (VCO) 5d, and a range selecting circuit 5f. The range selecting circuit 5f selects a frequency of a clock signal generated by a clock generator 5e and supplies the selected clock signal as a reference clock signal to the voltage controlled oscillator 5d.

Thus, the clock signal generated by the clock generator 5e is supplied as a VCO reference clock signal to the voltage controlled oscillator 5d through the range selecting circuit 5f. The phase comparing circuit 5b compares the phase of the EFM signal received from the level slice circuit 5g with the phase of a signal that is fed back as the PLL reference clock signal from the voltage controlled oscillator 5d. The phase comparing circuit 5b supplies the compared result as a phase difference signal to the low pass filter 5c. The low pass filter 5c removes a high frequency component from the phase difference signal and supplies the resultant signal to the voltage controlled oscillator 5d.

To generate a PLL clock signal that synchronizes with the frequency of the EFM signal, the PLL circuit 5a can select a capture range.

Thus, the voltage controlled oscillator 5d oscillates a clock signal with a frequency corresponding to a capture range. The signal processing circuit 7 reproduces data corresponding to the clock signal.

Next, the structure of the system controller 9 will be described in detail. The system controller 9 has a storing portion (such as a ROM) that stores knowledge information for a capture range (linear velocity range) optimum for the level slice PLL circuit 5 in a time period after an occurrence of a reproduction command until data is reproduced at a target linear velocity corresponding to the reproduction command (namely, after the disc is rotated by the disc motor 1 or the disc rotating speed is decelerated from the high speed reproducing operation to the low speed reproducing operation).

Figure 3:
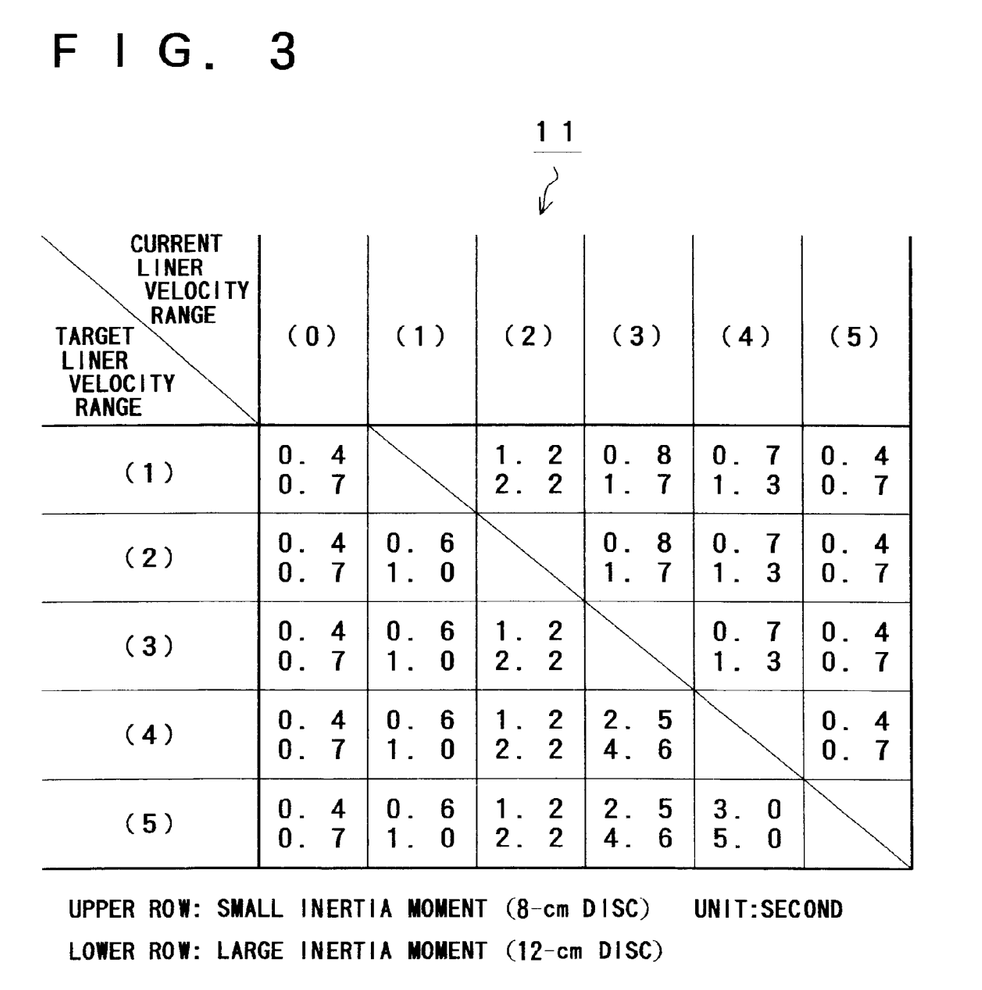
FIG. 3 is a table showing linear velocity knowledge that a system controller of the disc reproducing apparatus shown in FIG. 1 has.

FIG. 3 is a table showing an example of the linear velocity knowledge 11. As shown in FIG. 3, the linear velocity knowledge 11 is defined as time information of which a target linear velocity range is obtained from a current linear velocity range of the level slice PLL circuit 5. The linear velocity knowledge 11 is prepared for each of disc types such as a 12-cm disc and an 8-cm disc. Since the inertia moment of a disc depends on the diameter thereof, the inertia moment knowledge 12 should be prepared for each disc diameter.

Figure 4:
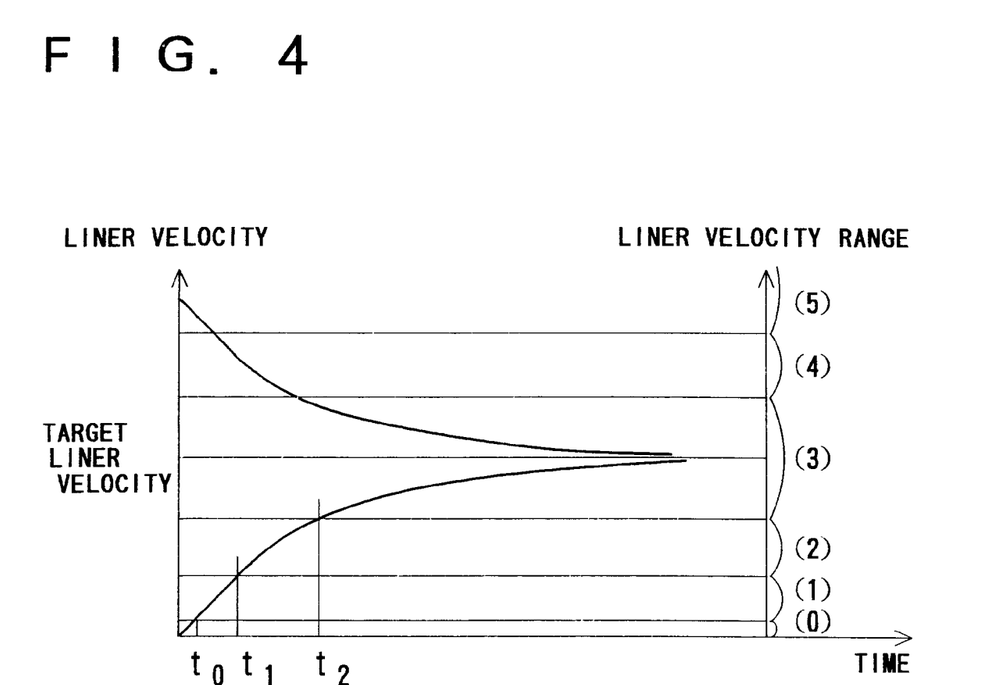
FIG. 4 is a graph showing the relation between a disc linear velocity and a linear velocity range of the disc reproducing apparatus shown in FIG. 1.

In FIGS. 3 and 4, (0) represents a linear velocity range corresponding to disc stop state. (5) represents the maximum linear velocity range. Now, the case that a 12-cm disc is accelerated assuming that the current linear velocity range is (0) and the target linear velocity range is (3) is considered. In this case, the linear velocity knowledge 11 is defined in such a manner that after the disc is driven, the linear velocity range (0) remains for 0.7 seconds; after 0.7 seconds elapse, the linear velocity range (0) is changed to (1); after 1.0 second elapses, the linear velocity range (1) is changed to (2); and after 2.2 seconds elapses, the linear velocity range (2) is changed to (3).

The system controller 9 (linear velocity selecting portion 13) automatically selects a linear velocity range optimum for the level slice PLL circuit 5 in a transient disc rotating state in the case that the reproducing speed is increased or decreased corresponding to elapsed time information of the timer 14 and the linear velocity knowledge 11.

Thus, in the disc reproducing apparatus according to the first embodiment of the present invention, since the linear velocity range of the level slice PLL circuit 5 is optimally selected corresponding to the liner velocity knowledge 11 that defines a current linear velocity range to a target linear velocity range along with time elements, even in a transient state such as an accelerating/decelerating state of the disc, data can be properly reproduced.

[Second Embodiment]

Figure 5:
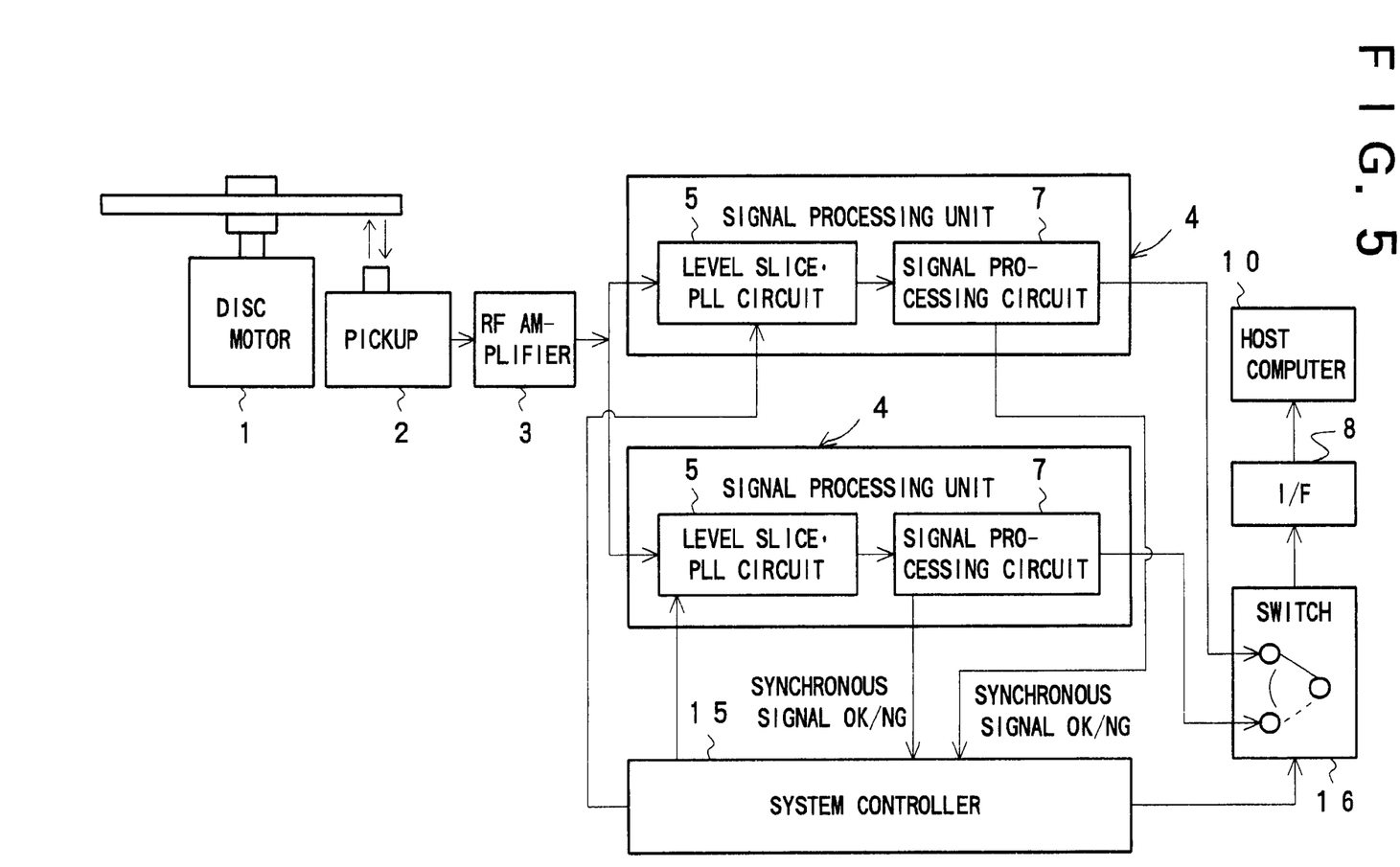
FIG. 5 is a block diagram showing a disc reproducing apparatus according to a second embodiment of the present invention.

Next, a second embodiment of the present invention will be described. FIG. 5 is a block diagram showing the structure of a disc reproducing apparatus according to the second embodiment of the present invention. As shown in FIG. 5, the disc reproducing apparatus according to the second embodiment comprises a system controller 15 instead of the system controller 9 of the disc reproducing apparatus according to the first embodiment. In addition, the disc reproducing apparatus according to the second embodiment further comprises two signal processing units 4 and a switch 16. The switch 16 selects one of output signals of the signal processing units 4 under the control of the system controller 15.

When the system controller 15 detects a synchronous signal from a predetermined one of the signal processing units 4 (referred to as first signal processing unit 4), the system controller 15 selects the signal processing unit 4 through the switch 16 and supplies reproduction data that is output from the first signal processing unit 4 to a host computer 10 through an I/F 8. In addition, the system controller 15 changes a linear velocity range of a level slice PLL circuit 5 of the other signal processing unit 4 (referred to as second signal processing unit 4) in such a manner that the relation between the size of the linear velocity range of the level slice PLL circuit 5 of the second signal processing unit and the size of the linear velocity range of the level slice PLL circuit 5 of the first signal processing unit is inverted. Thus, the system controller 15 alternately changes the linear velocity ranges of the level slice PLL circuits 5 of the first and second signal processing units 4 in a time period after an occurrence of a reproduction command until data is reproduced from the disc at a target linear velocity corresponding to the reproduction command.

Thus, in the disc reproducing apparatus according to the second embodiment, while the first signal processing unit 4 with a high (low) linear velocity range is properly reproducing data, the system controller 15 changes the linear velocity range of the second signal processing unit 4 to a higher (lower) linear velocity range than that of the first signal processing unit. Thus, data can be properly reproduced from the disc corresponding to the chronological variation of the linear velocity of the disc. Consequently, in a transient state such as an accelerating/decelerating state of the disc, data can be properly reproduced from the disc.

Figure 6:
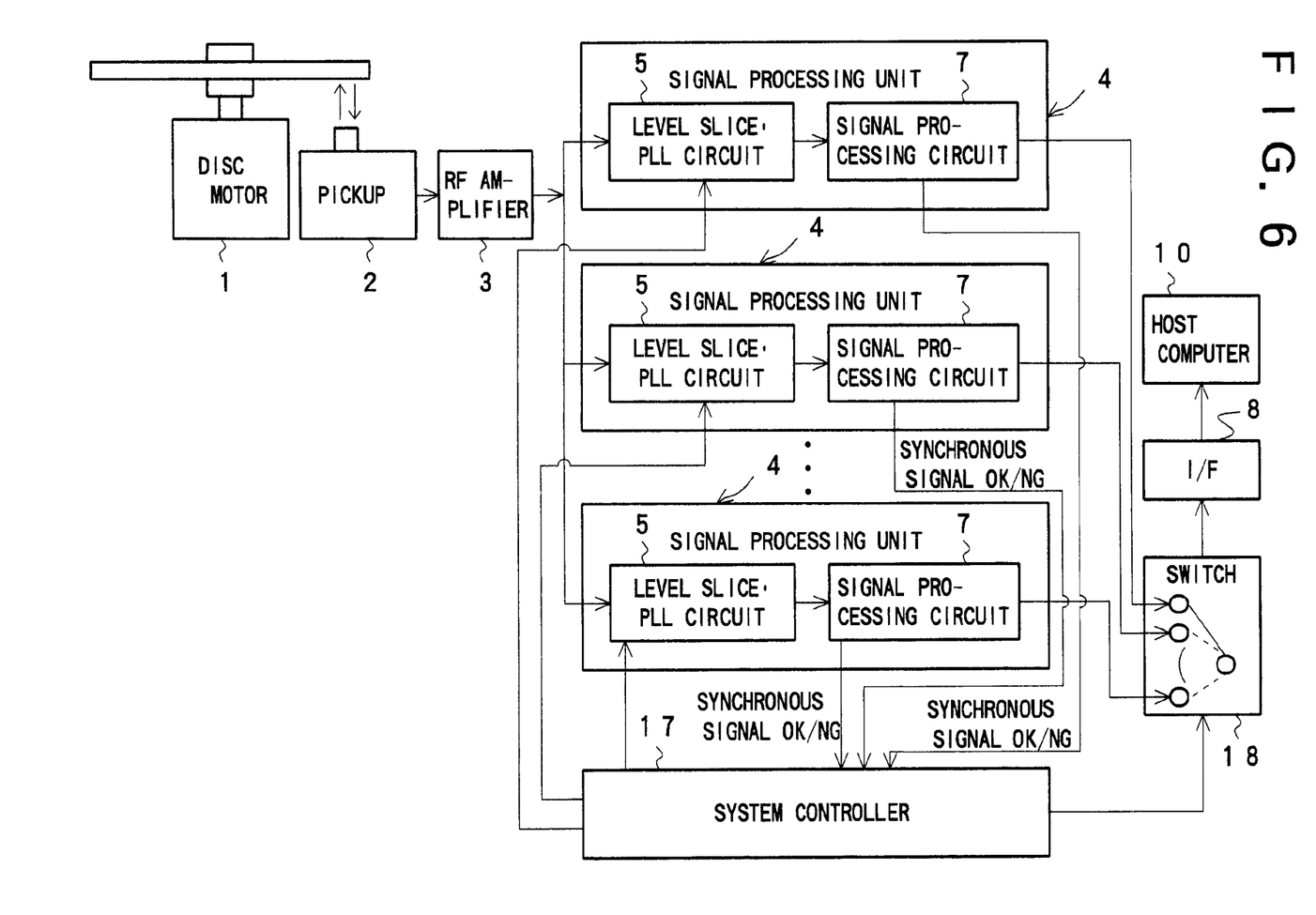
FIG. 6 is a block diagram showing a disc reproducing apparatus according to a third embodiment of the present invention.

Next, a third embodiment of the present invention will be described. FIG. 6 is a block diagram showing the structure of a disc reproducing apparatus according to the third embodiment. As shown in FIG. 6, the disc reproducing apparatus according to the third embodiment comprises a system controller 17 instead of the system controller 9 of the disc reproducing apparatus according to the first embodiment. The disc reproducing apparatus according to the third embodiment further comprises a plurality of signal processing units 4 and a switch 18. Level slice PLL circuits 5 of the signal processing units have different liner velocity ranges so as to allow one of the signal processing units to output a synchronous signal in a time period after an occurrence of a reproduction command until data is reproduced from the disc at a target liner velocity corresponding to the reproduction command. The switch 18 select one of output signals of the signal processing units 4 under the control of the system controller 17.

The system controller 17 properly selects one of the signal processing units 4 that output synchronous signals through the switch 18 and supplies reproduction data of the selected signal processing unit 4 to a host computer 10 through an I/F 8 in a time period after an occurrence of a reproduction command until data is reproduced from the disc at a target linear velocity corresponding to the reproduction command.

Thus, in the disc reproducing apparatus according to the third embodiment, one of level slice PLL circuits 5 with different linear velocity ranges of signal processing units outputs reproduction data. Consequently, data can be properly reproduced corresponding to the chronological variation of a real linear velocity of the disc. Thus, even in a transient state in an accelerating/decelerating state of the disc, reproduction data can be successively output.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. A disc reproducing apparatus, comprising:
   an optical pickup for reading a signal from a disc;
   two clock signal reproducing circuits for reproducing clock signals so as to reproduce data from the signal read by said optical pickup, said two clock signal reproducing circuits having different capture ranges;
   two signal processing circuits for reproducing data with the clock signals reproduced from said two clock signal reproducing circuits, said two signal processing circuits being disposed corresponding to said two clock signal reproducing circuits;
   selecting means for selecting reproduction data that has been correctly reproduced by one of said two signal processing circuits; and
   range shifting means for shifting the capture range of the clock signal reproducing circuit corresponding to a first signal processing circuit of said two signal processing circuits when said selecting means selects reproduction data reproduced from a predetermined one as a second signal processing circuit of said two signal processing circuits.

2. The disc-reproducing apparatus as set forth in claim 1, wherein said range shifting means shifts the capture range of the clock signal reproducing circuit corresponding to the second signal processing circuit so that the relation between the size of the capture range of the clock signal reproducing circuit corresponding to the second signal processing circuit and the size of the capture range of the clock signal reproducing circuit corresponding to the first signal processing circuit is inverted.

3. A disc reproducing apparatus, comprising:
   an optical pickup for reading a signal from a disc;
   a plurality of clock signal reproducing circuits for reproducing clock signals so as to reproduce data from the signal read from the disc by said optical pickup, said plurality of clock signal reproducing circuits having different capture ranges;
   a plurality of signal processing circuits for reproducing data with the clock signals reproduced from said plurality of clock signal reproducing circuits, said plurality of signal processing circuits being disposed corresponding to said plurality of clock signal reproducing circuits; and
   selecting means for selecting reproduction data that has been correctly reproduced by one of said plurality of signal processing circuits.

4. The disc reproducing apparatus as set forth in claim 3, wherein said selecting means selects reproduction data in a time period at least after an occurrence of a reproduction command until data is reproduced from the disc at a target liner velocity corresponding to the reproduction command.

5. A disc reproducing apparatus, comprising:
   an optical pickup configured to read a signal from a disc;
   a clock signal reproducing circuit for reproducing a clock signal so as to reproduce data from the signal read by said optical pickup;
   a signal processing circuit for reproducing data with the clock signal reproduced by said clock signal circuit; and
   range shifting means for shifting a capture range of said clock signal reproducing circuit, wherein said range shifting means shifts the capture range corresponding to predetermined time information, and wherein said range shifting means changes the shifting timing of the capture range corresponding to the size of the disc from which data is reproduced.

6. The disc reproducing apparatus as set forth in claim 5, wherein said range shifting the capture range at different timings a plurality of times corresponding to the time information.

7. The disc reproducing apparatus as set forth in claim 5, wherein said range shifting means slows the shifting timing of the capture range corresponding to the time information as the rotating speed of the disc becomes high.

8. A disc reproducing method of a disc reproducing apparatus having two clock signal reproducing circuits for reproducing clock signals so as to reproduce data from a signal read from a disc by an optical pickup, the clock signal reproducing circuits having different capture ranges, and two signal processing circuits for reproducing data with the clock signals reproduced by the clock signal reproducing circuits, the two signal processing circuits being disposed corresponding to the two clock signal reproducing circuits, comprising the steps of:

selecting reproduction data that has bean correctly reproduced by one of the signal processing circuits; and shifting the capture range of the clock signal reproducing circuit corresponding to a first signal processing circuit when the reproduction data of a predetermined one as a second signal processing circuit of the signal processing circuits is selected.

9. The disc reproducing method as set forth in claim 8, wherein the range shifting step is performed by shifting the capture range of the clock signal reproducing circuit corresponding to the second signal processing circuit so that the relation between the size of the capture range of the clock signal reproducing circuit corresponding to the second signal processing circuit and the size of the capture range of the clock signal reproducing circuit corresponding to the first signal processing circuit is inverted.

10. A disc reproducing method of a disc reproducing apparatus having a plurality of clock signal reproducing circuits for reproducing clock signals so as to reproduce data from the signal read from a disc by an optical pickup, the plurality of clock signal reproducing circuits having different capture ranges, and a plurality of signal processing circuits for reproducing data with the clock signals reproduced from the plurality of clock signal reproducing circuits, the plurality of signal processing circuits being disposed corresponding to the plurality of clock signal reproducing circuits, comprising the step of:

selecting reproduction data that has been correctly reproduced by one of the plurality of signal processing circuits.

11. The disc reproducing method as set forth in claim 10, wherein the selecting step is performed by selecting reproduction data in a time period at least after an occurrence of a reproduction command until data is reproduced from the disc at a target linear velocity corresponding to the reproduction command.

12. A disc reproducing method of a disc reproducing apparatus having a clock signal reproducing circuit for reproducing a clock signal so as to reproduce data from a signal read from a disc by an optical pickup, and a signal processing circuit for reproducing data with the clock signal reproduced by the clock signal reproducing circuit, comprising:

shifting a capture range of the clock signal reproducing circuit in a time period at least after an occurrence of a reproduction command until data is produced from the disc at a target linear velocity corresponding to the reproduction command, wherein the range shifting step is performed by shifting the capture range corresponding to predetermined time information, and wherein the range shifting step is performed by changing the shifting timing of the capture range corresponding to the size of the disc from which data is reproduced.

13. The disc reproducing method as set forth in claim 12, wherein the range shifting step is performed by shifting the capture range at different timings a plurality of times corresponding to the time information.

14. The disc reproducing method as set forth in claim 12, wherein the range shifting step is performed by slowing the shifting timing of the capture range corresponding to the time information as the rotating speed of the disc becomes high.

* * * * *

UNITED STATES PATENT AND TRADEMARK OFFICE
CERTIFICATE OF CORRECTION

PATENT NO. : 6,414,918 B1
DATED : July 2, 2002
INVENTOR(S) : Hiroaki Tanaka et al.

It is certified that error appears in the above-identified patent and that said Letters Patent is hereby corrected as shown below:

Column 3,
Line 29, change "synchronized" to -- synchronizes --.

Column 7,
Line 7, after "shifting," insert -- means shifts --.

Signed and Sealed this

Eighteenth Day of March, 2003

JAMES E. ROGAN
*Director of the United States Patent and Trademark Office*